United States Patent
Nakamoto et al.

(10) Patent No.: US 11,126,569 B2
(45) Date of Patent: Sep. 21, 2021

(54) INFORMATION PROCESSING SYSTEM, INFORMATION PROCESSING METHOD, AND PROGRAM

(71) Applicant: MITSUBISHI HEAVY INDUSTRIES MACHINERY SYSTEMS, LTD., Hyogo (JP)

(72) Inventors: Hiromichi Nakamoto, Tokyo (JP); Naruhisa Kameo, Tokyo (JP); Hiroyuki Nakayama, Tokyo (JP)

(73) Assignee: MITSUBISHI HEAVY INDUSTRIES MACHINERY SYSTEMS, LTD., Hyogo (JP)

(*) Notice: Subject to any disclaimer, the term of this patent is extended or adjusted under 35 U.S.C. 154(b) by 0 days.

(21) Appl. No.: 16/759,104

(22) PCT Filed: Oct. 31, 2017

(86) PCT No.: PCT/JP2017/039315
§ 371 (c)(1),
(2) Date: Apr. 24, 2020

(87) PCT Pub. No.: WO2019/087294
PCT Pub. Date: May 9, 2019

(65) Prior Publication Data
US 2020/0341913 A1 Oct. 29, 2020

(51) Int. Cl.
*G06F 3/00* (2006.01)
*G06F 13/10* (2006.01)
(Continued)

(52) U.S. Cl.
CPC ........ *G06F 13/102* (2013.01); *G06F 9/30101* (2013.01); *G06F 9/44505* (2013.01)

(58) Field of Classification Search
CPC .................................................. G06F 13/102
See application file for complete search history.

(56) References Cited

U.S. PATENT DOCUMENTS

| | | | |
|---|---|---|---|
| 6,507,879 B1* | 1/2003 | Sayles | G06F 13/423 710/10 |
| 6,721,881 B1* | 4/2004 | Bian | G06F 9/4411 710/104 |

(Continued)

FOREIGN PATENT DOCUMENTS

| JP | H01318117 A | 12/1989 |
|---|---|---|
| JP | 2013513836 A | 4/2013 |

(Continued)

OTHER PUBLICATIONS

International Search Report and Written Opinion of International Application No. PCT/JP2017/039315 dated Jan. 9, 2018; 13pp.

*Primary Examiner* — Henry Tsai
*Assistant Examiner* — Dean Phan
(74) *Attorney, Agent, or Firm* — Kanesaka Berner and Partners LLP

(57) ABSTRACT

An information processing system includes a control unit, a peripheral device including a first register, a second register, and an initialization flag circuit, in which the initialization flag circuit is configured to output a high level signal when the information processing system is started and is configured to output a low level signal in a case where data indicating a low level is written into the second register, the low level signal being the same level as the low level, and in which the control unit is configured to write initial setting data for initializing the peripheral device into the first register in a case where the control unit determines that an output signal from the initialization flag circuit is a high level and is configured to write data indicating a low level into the second register, the low level indicating that writing of the initial setting data is completed.

3 Claims, 5 Drawing Sheets

(51) Int. Cl.
*G06F 9/30* (2018.01)
*G06F 9/445* (2018.01)

(56) References Cited

U.S. PATENT DOCUMENTS

| | | |
|---|---|---|
| 2012/0254600 A1 | 10/2012 | Fujimoto |
| 2013/0091338 A1 | 4/2013 | Iwasaki et al. |
| 2015/0205619 A1 | 7/2015 | Kato |
| 2017/0168852 A1 | 6/2017 | Shen et al. |

FOREIGN PATENT DOCUMENTS

| | | |
|---|---|---|
| JP | 2013084153 A | 5/2013 |
| JP | 2015156205 A | 8/2015 |
| JP | 2017111788 A | 6/2017 |
| JP | 2017142754 A | 8/2017 |

* cited by examiner

INFORMATION PROCESSING SYSTEM, INFORMATION PROCESSING METHOD, AND PROGRAM

RELATED APPLICATIONS

The present application is a National Phase of International Application Number PCT/JP2017/039315 filed Oct. 31, 2017.

TECHNICAL FIELD

The present invention relates to an information processing system, an information processing method, and a program.

BACKGROUND ART

In various information processing systems such as a car navigation system and a game machine, there is demand for using an information processing system from a user right after a starting operation is performed on the information processing system. Thus, the information processing system may be desired to be immediately started in a predetermined state (for example, a factory default state, or a state right before a power source of an apparatus is turned off).

As a related technique, Patent Literature 1 discloses a technique in which data indicating a storage state of a volatile memory, a register value of a peripheral device, and a register value of a processor before a system is stopped is stored in a nonvolatile memory, and an operating system (OS) immediately initializes the information processing system by reproducing a state before the system is stopped by using the data stored in the nonvolatile memory according to a kernel function at the time of starting the system.

CITATION LIST

Patent Literature

Patent Literature 1

Japanese Unexamined Patent Application, First Publication No. 2015-156205

SUMMARY OF INVENTION

Technical Problem

Peripheral devices used in the information processing system include a peripheral device that is initialized to a state of being able to be immediately operated from a predetermined state after being started as a result of data including snapshot image information being written into a main memory when the information processing system is started, and a peripheral device that includes a register and is not initialized to an operable state after being started until the register is initially set. The snapshot image information indicates a predetermined state such as a factory default state or a state right before a power source of an apparatus is turned off and is stored in a nonvolatile memory not to be lost even in a case where the information processing system is shut down. In a case where the information processing system is shut down and is then started, a value of a register of a peripheral device including the register is brought into a so-called undefined state. Therefore, the peripheral device including the register cannot be operated until initial setting data indicating initial setting is written into the register, that is, until the register is initialized. In other words, since the peripheral device including the register is not initialized, in the information processing system, the peripheral device including the register cannot be immediately used after the information processing system is started.

Thus, there is the demand for a technique of being able to immediately initialize a peripheral device including a register when an information processing system is started.

An object of the present invention is to provide an information processing system, an information processing method, and a program capable of solving the problem.

Solution to Problem

According to a first aspect of the present invention, an information processing system includes a control unit; a peripheral device including a first register; a second register; and an initialization flag circuit, in which the initialization flag circuit is configured to output a high level signal when the information processing system is started, and is configured to output a low level signal in a case where data indicating a low level is written into the second register, the low level signal being the same level as the low level, and in which the control unit is configured to write initial setting data for initializing the peripheral device into the first register in a case where the control unit determines that an output signal from the initialization flag circuit is a high level, and is configured to write data indicating a low level into the second register, the low level indicating that writing of the initial setting data is completed.

In the information processing system, the initialization flag circuit outputs a high level signal only when the information processing system is started. Thus, the control unit can determine that the information processing system has been started, that is, the initial setting data is required to be written into the first register (that is, initialization is required to be performed). The control unit writes the data indicating a low level into the second register, and thus performs initialization only in a case where the information processing system is started again even in a case where a value of the second register is periodically acquired.

As a result, the information processing system can perform initialization of peripheral devices including registers without omission and redundancy (without repeating initialization) when the information processing system is started and can thus reliably operate the peripheral devices even during fast starting.

According to a second aspect of the present invention, an information processing method executed by an information processing system including a control unit, a peripheral device including a first register, a second register, and an initialization flag circuit, the information processing method includes the steps of: causing the initialization flag circuit to output a high level signal when the information processing system is started and to output a low level signal in a case where data indicating a low level is written into the second register, the low level signal being the same level as the low level; and causing the control unit to write initial setting data for initializing the peripheral device into the first register in a case where the control unit determines that an output signal from the initialization flag circuit is a high level and to write data indicating a low level into the second register, the low level indicating that writing of the initial setting data is completed.

In the information processing method, the initialization flag circuit outputs a high level signal only when the information processing system is started. Thus, the control unit can determine that the information processing system has been started, that is, the initial setting data is required to be written into the first register (that is, initialization is required to be performed). The control unit writes the data indicating a low level into the second register and thus performs initialization only in a case where the information processing system is started again even in a case where a value of the second register is periodically acquired.

As a result, in the information processing method, it is possible to perform initialization of peripheral devices including registers without omission and redundancy (without repeating initialization) when the information processing system is started and thus to reliably operate the peripheral devices even during fast starting.

According to a third aspect of the present invention, a program executed in an information processing system including a control unit, a peripheral device including a first register, a second register, and an initialization flag circuit, the initialization flag circuit outputting a high level signal when the information processing system is started, and outputting a low level signal in a case where data indicating a low level is written into the second register, the low level signal being the same level as the low level, the program which causes the control unit to execute the steps of: writing initial setting data for initializing the peripheral device into the first register in a case where the control unit determines that an output signal from the initialization flag circuit is a high level; and writing data indicating a low level into the second register, the low level indicating that writing of the initial setting data is completed.

According to the program, the control unit can determine that the information processing system has been started, that is, the initial setting data is required to be written into the first register (that is, initialization is required to be performed). The control unit writes the data indicating a low level into the second register, and thus performs initialization only in a case where the information processing system is started again even in a case where a value of the second register is periodically acquired.

As a result, in the program, it is possible to perform initialization of peripheral devices including registers without omission and redundancy (without repeating initialization) when the information processing system is started, and thus to reliably operate the peripheral devices even during fast starting.

Advantageous Effects of Invention

The information processing system according to the embodiment of the present invention can perform initialization of peripheral devices including registers without omission and redundancy (without repeating initialization) when the information processing system is started, and can thus reliably operate the peripheral devices even during fast starting.

DESCRIPTION OF EMBODIMENTS

Embodiments (Configuration of Information Processing System)

Hereinafter, a description will be made of a configuration of an information processing system according to an embodiment of the present invention.

Figure 1:
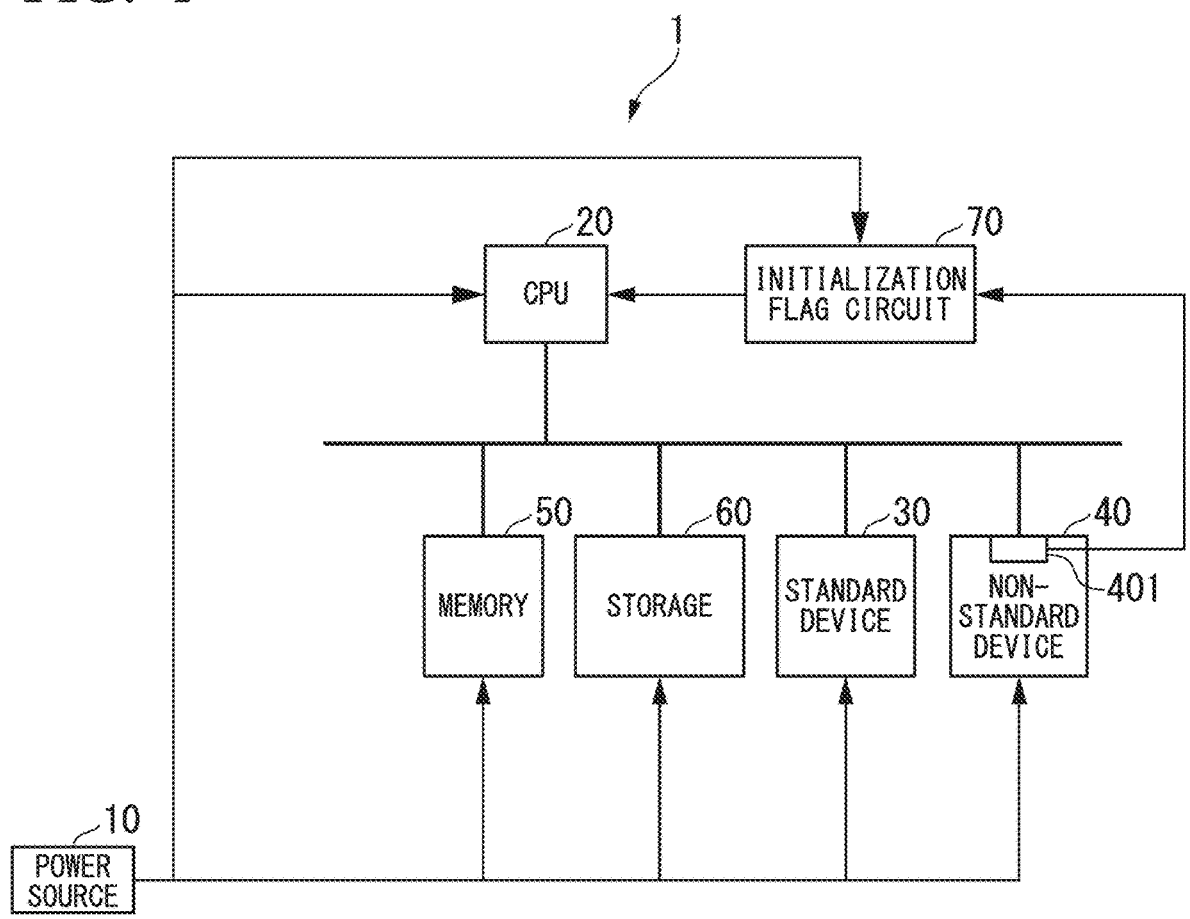
FIG. 1 is a diagram illustrating an example of a configuration of an information processing system according to an embodiment of the present invention.

An information processing system 1 according to the embodiment of the present invention is a system that initializes a peripheral device including a register at the substantially same timing as a timing at which a peripheral device is initialized as a result of data including snapshot image information being written into a main memory when the information processing system is started. The snapshot image information is data indicating a predetermined state such as a state right before the information processing system 1 is stopped or a factory default state, stored in a nonvolatile memory. The initialization is set each peripheral device to an operable state. Fast starting indicates that the information processing system 1 is initiated to be started, and the information processing system 1 is started in a predetermined state such as a factory default state or a state right before a power source of an apparatus is turned off as a result of data including the snapshot image information being written into a main memory. The information processing system 1 is started fast to initialize a peripheral device including a register, and thus a user can initiate to use the information processing system 1 from the predetermined state right after the information processing system is started. As illustrated in FIG. 1, the information processing system 1 includes a power source 10, a central processing unit (CPU) 20 (an example of a control unit), a standard device 30, a non-standard device 40 (an example of a peripheral device including a register), a memory 50, a storage 60, and an initialization flag circuit 70.

The power source 10 supplies power to each of the CPU 20, the standard device 30, the non-standard device 40, the memory 50, the storage 60, and the initialization flag circuit 70.

The standard device 30 is a peripheral device that is initialized as a result of data including snapshot image information being written into a main memory. The data including the snapshot image information is written into the memory 50 by a bootloader when the power source 10 is started in the information processing system 1, and thus the standard device 30 can be started fast in a predetermined state. The predetermined state is a state right before the information processing system 1 stops a process, a factory default state, or the like.

The non-standard device 40 is a peripheral device including a register. The non-standard device 40 is brought into an operable state as a result of initial setting data indicating initial setting being written into the register. As illustrated in FIG. 1, the non-standard device 40 includes a register 401 (an example of a first register). The register 401 is a register preserving the initial setting data.

The memory 50 is a main memory used for processing by the CPU 20. The memory 50 is a volatile memory. Data is transmitted and received at a high speed between the memory 50 and the CPU 20. When the information processing system 1 is started, the data including the snapshot image information stored in the storage 60 is written into the memory 50. The data including the snapshot image information is written into the memory 50, and thus each of the CPU 20, the standard device 30, the memory 50, and the storage 60 becomes operable.

The storage 60 is a nonvolatile memory. The storage 60 stores the data including the snapshot image information. The storage 60 stores an OS, an application program, data processed by the application program, and the like. The storage 60 stores in advance a correlation between a register 706 and the register 401 included in the non-standard device 40 that is an initialization target in a case where an initialization flag preserved in the register 706 indicates a high level. The storage 60 stores the initial setting data for the non-standard device 40 including the register 401.

(Configuration of Initialization Flag Circuit)

The initialization flag circuit 70 is a circuit that outputs a high level signal as an output from a register even in a case where the register included in the initialization flag circuit 70 is brought into an undefined state (for example, a state in which output impedance is high impedance) when the power source 10 is turned on. In the embodiment of the present invention, a signal output from the initialization flag circuit 70 is an initialization flag. A high level signal output from the initialization flag circuit 70 is a signal indicating that the non-standard device 40 is required to be initialized. A low level signal output from the initialization flag circuit 70 is a signal indicating that initialization of the non-standard device 40 is completed. An input terminal of the initialization flag circuit 70 is connected to an output terminal of the register preserving the initialization flag. An output terminal of the initialization flag circuit 70 is connected to the CPU 20.

Figure 2:
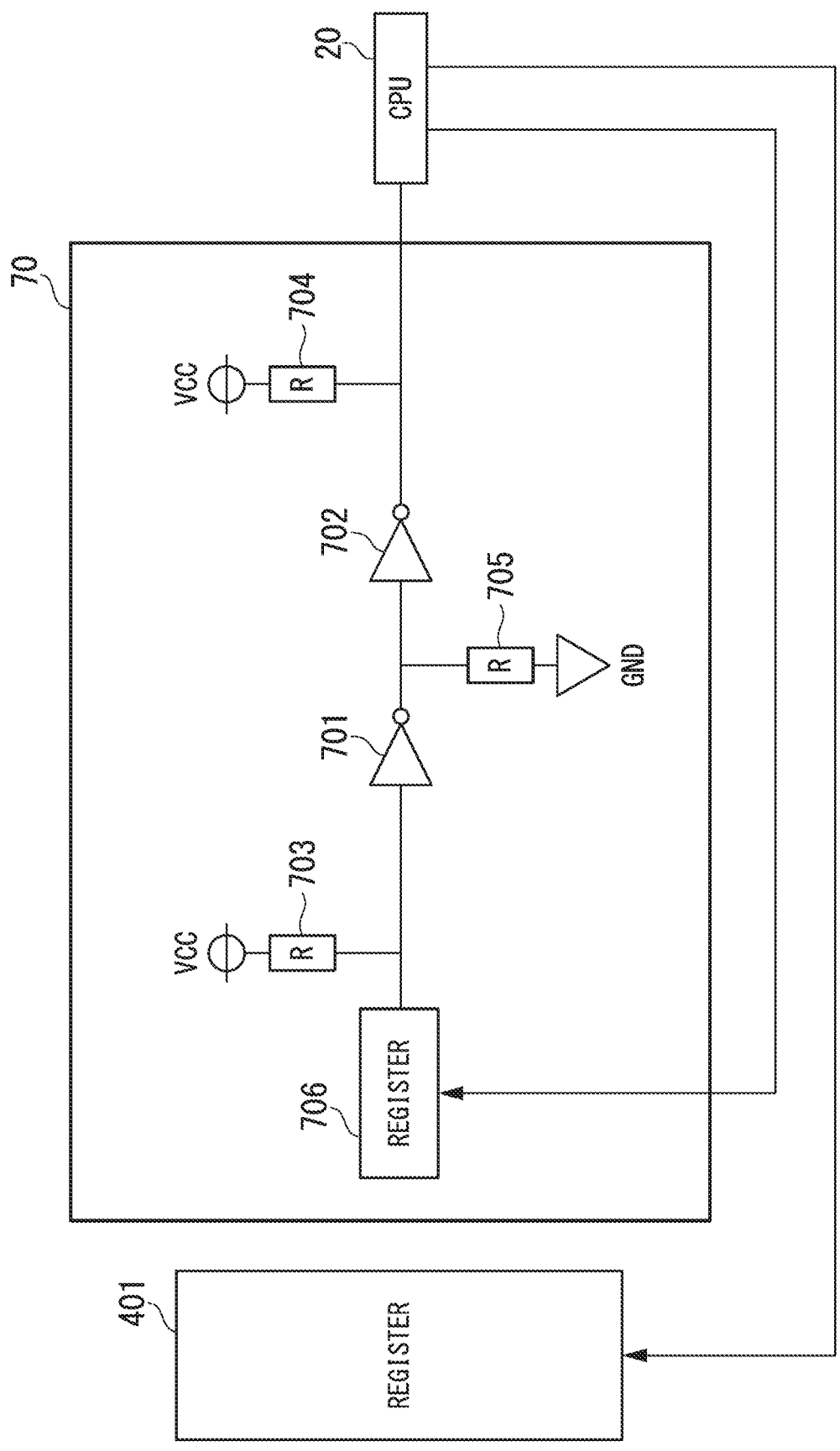
FIG. 2 is a diagram illustrating an example of a configuration of an initialization flag circuit according to the embodiment of the present invention.

As illustrated in FIG. 2, the initialization flag circuit 70 includes, for example, inverter circuits 701 and 702, pull-up circuits 703 and 704, a pull-down circuit 705, and the register 706 (an example of a second register).

An input terminal of the inverter circuit 701 is connected to an output terminal of the register 706 and a first terminal of the pull-up circuit 703.

An output terminal of the inverter circuit 701 is connected to an input terminal of the inverter circuit 702 and a first terminal of the pull-down circuit 705.

An output terminal of the inverter circuit 702 is connected to a first terminal of the pull-up circuit 704 and the CPU 20.

A second terminal of the pull-up circuit 703 is connected to an output terminal (indicated by the reference sign VCC in FIG. 2) of the power source 10.

A second terminal of the pull-up circuit 704 is connected to the output terminal of the power source 10.

A second terminal of the pull-down circuit 705 is connected to a ground terminal (indicated by the reference sign GND in FIG. 2).

The register 706 preserves a high level initialization flag indicating that the non-standard device 40 is required to be initialized or a low level initialization flag indicating that initialization of the non-standard device 40 is completed.

Each of the inverter circuits 701 and 702 is a circuit that is configured by using a transistor such as a metal-oxide-semiconductor field-effect transistor (MOSFET) or a bipolar transistor and outputs a signal obtained by inverting a logic of an input signal.

Each of the pull-up circuits 703 and 704, and the pull-down circuit 705 is, for example, a resistor.

The initialization flag circuit 70 is configured to output a high level signal regardless of a starting order of each circuit of the initialization flag circuit 70 by using each of the pull-up circuits 703 and 704, and the pull-down circuit 705.

(Function of CPU)

The CPU 20 acquires data preserved in the register 706 via the initialization flag circuit 70. The CPU 20 receives the high level initialization flag via the pull-up circuit 704 right after the power source 10 is started. In a case where the high level initialization flag is received right after the power source 10 is started, the CPU 20 writes the initial setting data for the non-standard device 40 stored in the storage 60 into the register 401. In a case where the initial setting data is written in the register 401, the CPU 20 rewrites the data preserved in the register 706 to data indicating a low level.

Next, a description will be made of a process in the information processing system 1 according to the embodiment of the present invention.

Figure 3:
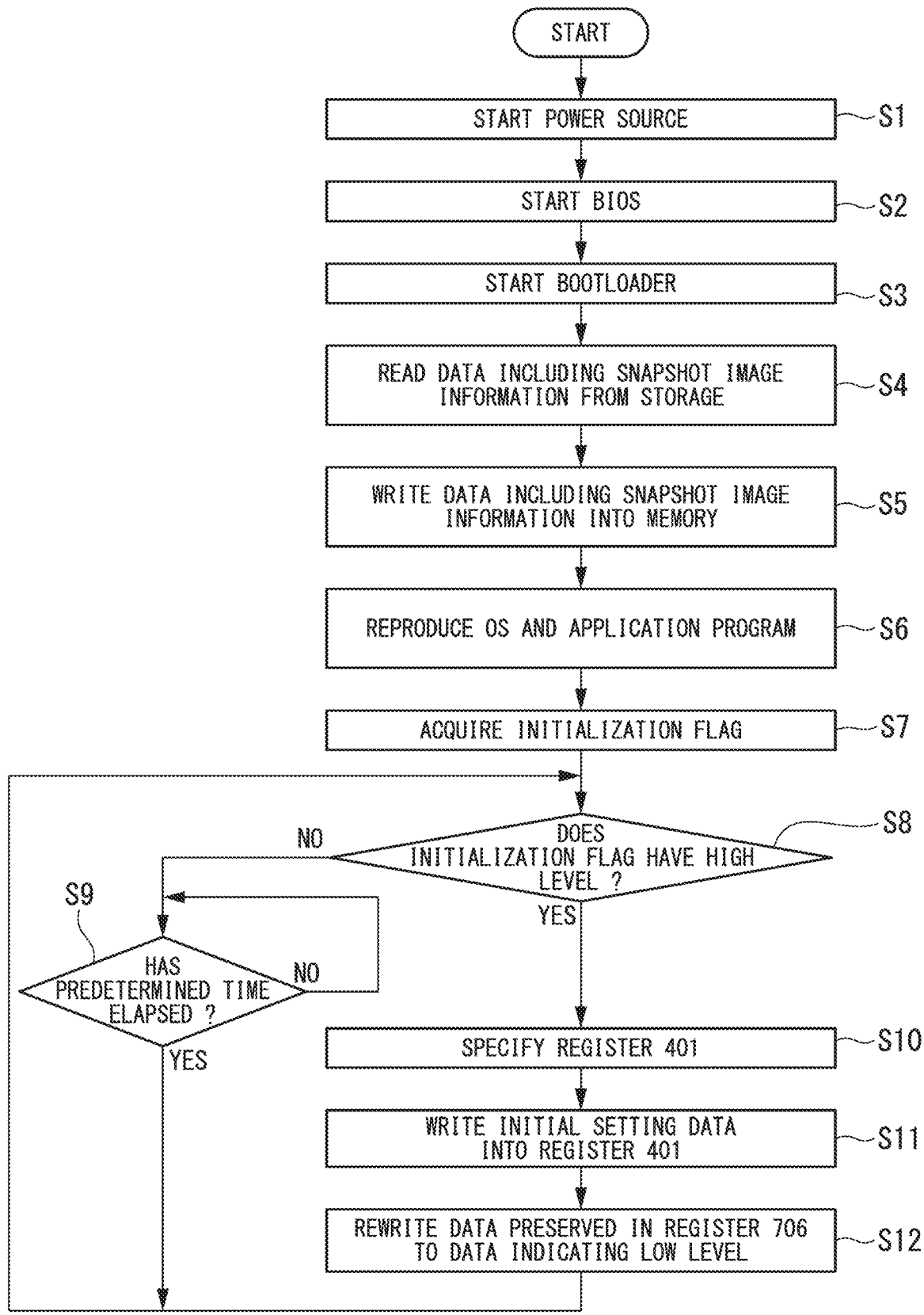
FIG. 3 is a diagram illustrating an example of a processing flow of the information processing system according to the embodiment of the present invention.

Herein, a description will be made of a process in the information processing system 1 in a case where a user of the information processing system 1 stops the use of the information processing system 1 and then starts the information processing system 1 by using a processing flow in the information processing system 1 according to the embodiment of the present invention, illustrated in FIG. 3.

The user of the information processing system 1 stops the use of the information processing system 1 and turns off the power source 10 of the information processing system 1. Thereafter, the user of the information processing system 1 starts the power source 10 from an OFF state to an ON state (step S1).

In a case where the power source 10 is started, the Basic Input Output System (BIOS) starts (step S2), recognizes devices including the CPU 20, the memory 50, and the storage 60 defined by the BIOS and establishes connection among input and output ports of the devices. In a case where the process in the BIOS is completed, the CPU 20 starts a bootloader (step S3).

The CPU 20 causes the bootloader to read the data including the snapshot image information from the storage 60 (step S4). The CPU 20 writes the read data including the snapshot image information into the memory 50 (step S5). The data including the snapshot image information is written into the memory 50, and thus the standard device 30 is initialized to be brought into a predetermined state. The predetermined state is, for example, a factory default state in a case where the storage 60 stores in advance the factory default state as the data including the snapshot image information. The predetermined state is, for example, a state at the time of stoppage in a case where the storage 60 stores the state at the time of stoppage when the use of the information processing system 1 is stopped, as the data including the snapshot image information.

In a case where the CPU 20 has completed writing of the data including the snapshot image information into the memory 50, an application program (an example of a program) for initializing a started operating system (OS) and the started non-standard device 40 is reproduced (step S6).

The CPU 20 acquires an output signal from the initialization flag circuit 70, that is, the initialization flag according to the application program (step S7). The CPU 20 determines whether or not the acquired initialization flag has a high level according to the application program (step S8). Hereinafter, even in a case where there is no particular disclosure such as "according to the application program", the CPU 20 executes a process according to the application program.

In a case where it is determined that the acquired initialization flag has a low level (NO in step S8), the CPU 20 determines that there is no non-standard device 40 that is required to be initialized. The CPU 20 determines whether or not a predetermined time has elapsed (step S9).

In a case where it is determined that the predetermined time has not elapsed (NO in step S9), the CPU 20 performs the process in step S9 again.

In a case where it is determined that the predetermined time has elapsed (YES in step S9), the CPU 20 returns to the process in step S9.

In a case where it is determined that the acquired initialization flag has a high level (YES in step S8), the CPU 20 determines that there is the non-standard device 40 that is required to be initialized. The CPU 20 specifies the register 401 that is in advance associated with the register 706 of the connection destination from which the high level initialization flag is acquired, in the data stored in the storage 60 (step S10).

The CPU 20 reads initial setting data of the non-standard device 40 including the specified register 401 from the storage 60. The CPU 20 writes the read initial setting data into the register 401 (step S11). The non-standard device 40 is brought into an operable state through the process in step S11.

In a case where writing of the initial setting data into the register 401 is completed, the CPU 20 rewrites the data preserved in the register 706 to data indicating a low level (step S12). The CPU 20 returns to the process in step S8.

The initialization flag circuit 70 normally outputs a high level signal to the CPU 20 until the power source 10 is initiated to be started and a value of the register 706 is rewritten to data indicating a low level. The high level signal is an initialization flag indicating that the non-standard device 40 is required to be initialized. A value preserved in the register 706 is undefined right after the power source 10 is initiated to be started. Thus, an output from the register 706 is unstable. However, the input and output terminals of the inverter circuits 701 and 702 configuring the initialization flag circuit 70 are set to appropriate initial logics by using each of the pull-up circuits 703 and 704 and the pull-down circuit 705, and thus the initialization flag circuit 70 can normally output a predetermined level signal (a high level signal in the example of the initialization flag circuit 70 illustrated in FIG. 2).

(Advantageous Effects)

As mentioned above, the information processing system 1 according to the embodiment of the present invention has been described.

In the information processing system 1 according to the embodiment of the present invention, in a case where an initialization flag indicating starting of the power source 10 is acquired, when the information processing system 1 is started, the CPU 20 reads initial setting data for initializing the non-standard device 40 from the storage 60 according to the application program. The CPU 20 writes the initial setting data into the register 401. The CPU 20 rewrites data preserved in the register 706 to data indicating a low level.

In the above-described way, the information processing system 1 according to the embodiment of the present invention can perform initialization of peripheral devices including registers without omission and redundancy (without repeating initialization) when the information processing system is started and can thus reliably operate the peripheral devices even during fast starting.

(Modification Example)

In the information processing system 1 according to the embodiment of the present invention, the initialization flag circuit 70 has been described as the circuit illustrated in FIG. 2. However, in the information processing system 1 according to another embodiment of the present invention, the initialization flag circuit 70 may be any circuit as long as the circuit outputs a signal of which a level is a stable high level until the power source 10 is initiated to be started and a value of the register 706 is rewritten to data indicating a low level and outputs a signal having a level matching a signal level (that is, a level of either a high level or a low level) of an initialization flag preserved in the register 706.

Figure 4:
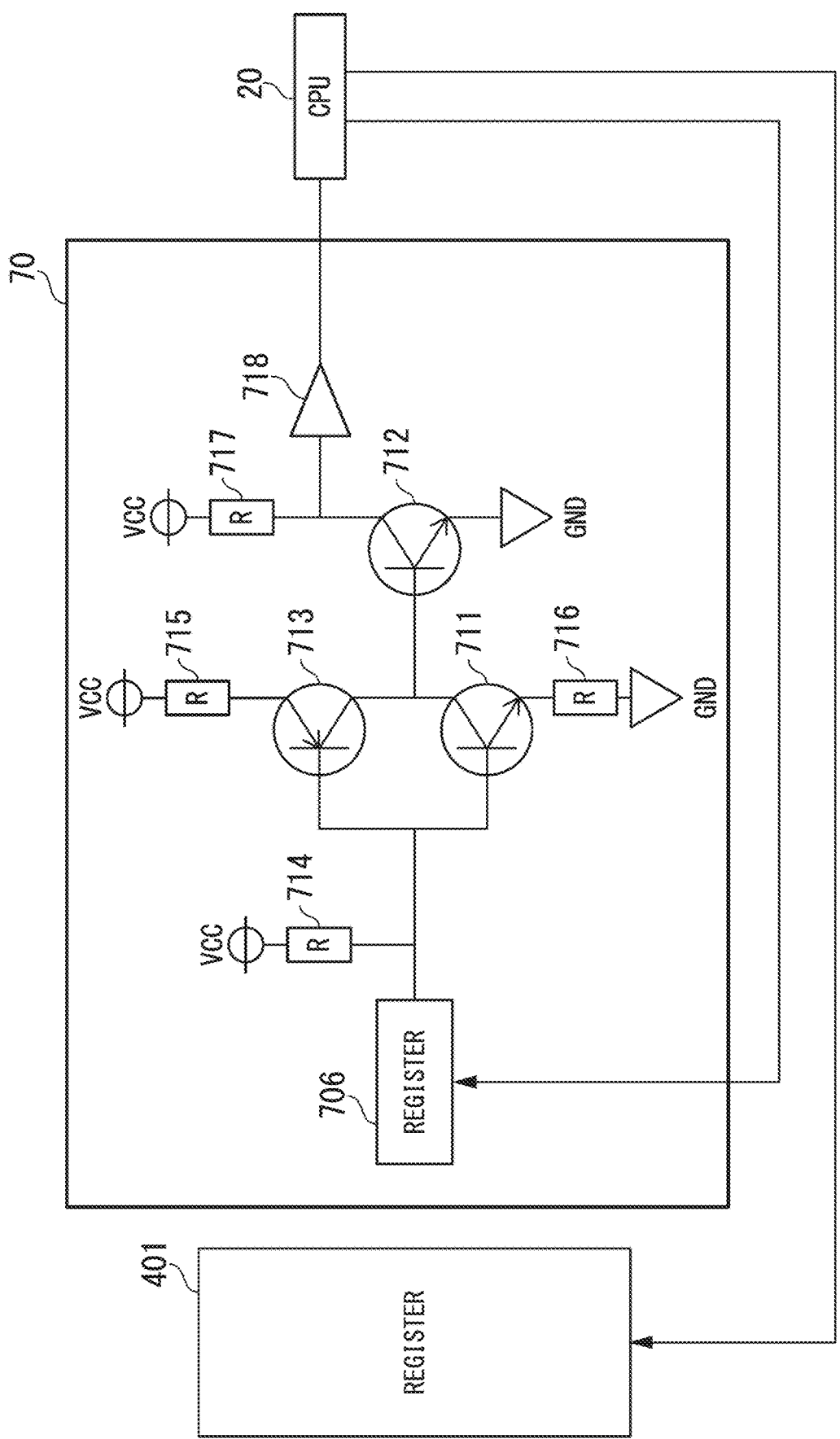
FIG. 4 is a diagram illustrating an example of a configuration of an initialization flag circuit according to another embodiment of the present invention.

For example, in the information processing system 1 according to another embodiment of the present invention, as illustrated in FIG. 4, the initialization flag circuit 70 may include a register 706, NPN transistors 711 and 712, a PNP transistor 713, resistors 714, 715, 716, and 717, and a buffer 718.

A first terminal of the resistor 714 is connected to the register 706, a base of the NPN transistor 711, and a base of the PNP transistor 713. A second terminal of the resistor 714 is connected to an output terminal of the power source 10.

A first terminal of the resistor 715 is connected to an emitter of the PNP transistor 713. A second terminal of the resistor 715 is connected to the output terminal of the power source 10.

A first terminal of the resistor 716 is connected to an emitter of the NPN transistor 711. A second terminal of the resistor 716 is connected to the ground GND.

A first terminal of the resistor 717 is connected to a collector of the NPN transistor 712 and an input terminal of the buffer 718. A second terminal of the resistor 717 is connected to the output terminal of the power source 10.

A collector of the NPN transistor 711 is connected to a base of the NPN transistor 712 and a collector of the PNP transistor 713.

An output terminal of the buffer 718 is connected to the CPU 20.

In a case where the power source 10 is started, and outputs a high level voltage, the base of the NPN transistor 711 is turned to a high level. In a case where the base of the NPN transistor 711 is turned to a high level, the PNP transistor 713 is turned off such that a current does not flow therethrough. In a case where the base of the NPN transistor 711 is turned to a high level, the NPN transistor 711 is turned on to extract a current from the base of the NPN transistor 712. Thus, the NPN transistor 712 is turned off such that a current does not flow therethrough. In a case where a current does not flow through the NPN transistor 712, a current does not flow through the resistor 717. Thus, a high level signal is input to the input terminal of the buffer 718. Therefore, the high level signal is input to the CPU 20. The CPU 20 detects the high level signal and writes initial setting data into the register 401.

Thereafter, the CPU 20 rewrites data preserved in the register 706 to data indicating a low level. Then, a signal at the base of the NPN transistor 711 is turned to a low level. In a case where the signal at the base of the NPN transistor 711 is turned to a low level, the NPN transistor 711 is turned off such that a current does not flow therethrough. In a case where a signal at the base of the PNP transistor 713 is turned to a low level, the PNP transistor 713 is turned on such that a current flows through the base of the NPN transistor 712. Thus, the NPN transistor 712 is turned on such that a current flows through the resistor 717. In this case, a voltage drop occurs in the resistor 717, and thus a low level signal is input to the input terminal of the buffer 718. Therefore, the low level signal is input to the CPU 20. In a case where the low level signal is detected, the CPU 20 does not initialize the register 401.

In the embodiment of the present invention, the register 706 has been described to be included in the initialization flag circuit 70. However, the register 706 may be provided at any location in the information processing system 1 as long as an appropriate process is performed.

Regarding the process in the embodiment of the present invention, an order of the process may be changed as long as an appropriate process is performed.

Each of storage units including the memory, the storage, and the register, and other storage devices in the embodiment of the present invention may be provided at any location as long as appropriate transmission and reception of information are performed. Each of storage units and other storage devices may be provided in a plurality and may store data in a distributed manner as long as appropriate transmission and reception of information are performed.

The embodiments of the present invention have been described, but a control device other than the control unit of the information processing system 1 may be provided with a computer system therein. The processing procedures are stored on a computer readable recording medium in the form of a program, and the processes are performed by a computer reading and executing the program. A specific example of the computer will be described below.

Figure 5:
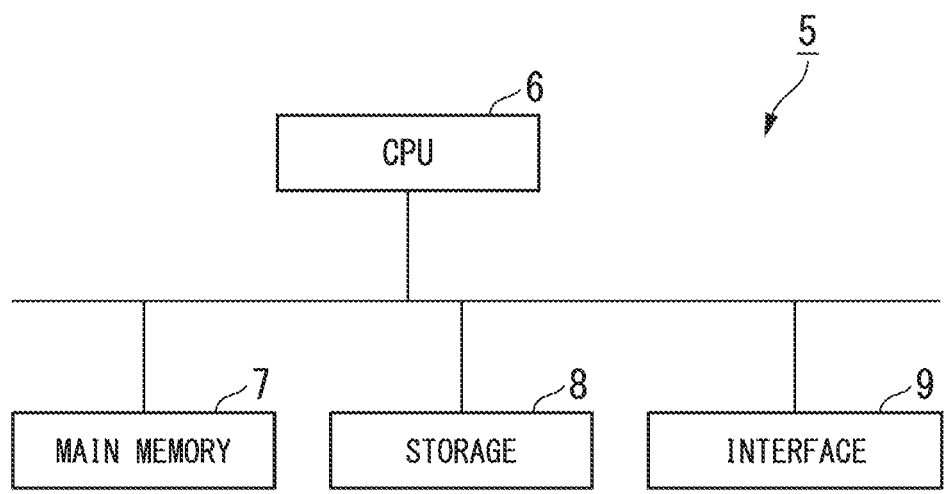
FIG. 5 is a schematic block diagram illustrating a configuration of a computer according to at least one embodiment.

FIG. 5 is a schematic block diagram illustrating a configuration of a computer according to at least one embodiment.

As illustrated in FIG. 5, a computer 5 includes a CPU 6, a main memory 7, a storage 8, and an interface 9.

For example, each of control devices other than the control unit of the information processing system 1 is mounted on the computer 5. An operation of each of the processing units is stored in the storage 8 in the form of a program. The CPU 6 reads the program from the storage 8, develops the program onto the main memory 7, and executes the process according to the program. The CPU 6 secures a storage region corresponding to each of the storage units in the main memory 7 according to the program.

Examples of the storage 8 may include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 8 may be an internal medium directly connected to a bus of the computer 5 and may be an external medium connected to the computer 5 via the interface 9 or a communication line. In a case where the program is delivered to the computer 5 via a communication line, the computer 5 having delivered the program may develop the program onto the main memory 7 so as to execute the processes. In at least one embodiment, the storage 8 is a non-transitory type storage medium.

The program may realize some of the functions. The program may be a file, a so-called difference file (difference program) that can realize the functions in combination with a program that has already been recorded on a computer system.

Some embodiments of the present invention have been described, but the embodiments are only examples and do not limit the scope of the present invention. The embodiments may be variously added, omitted, replaced, and changed within the scope without departing from the spirit of the invention.

INDUSTRIAL APPLICABILITY

The information processing system according to the embodiment of the present invention can perform initialization of peripheral devices including registers without omission and redundancy (without repeating initialization) when the information processing system is started and can thus reliably operate the peripheral devices even during fast starting.

INDUSTRIAL APPLICABILITY

1 Information processing system
5 Computer
6 CPU
7 Main memory
8 Storage
9 Interface
10 Power source
20 CPU
30 Standard device
40 Non-standard device
50 Memory
60 Storage
70 Initialization flag circuit
401, 706 Register
701, 702 Inverter
703, 703 pull-up circuit
705 pull-down circuit
711, 712 NPN transistor
713 PNP transistor
714, 715, 716, 717 resistor
718 buffer

The invention claimed is:

1. An information processing system comprising:
a control unit;
a peripheral device including a first register;
a second register; and
an initialization flag circuit,
wherein the initialization flag circuit is configured to
normally output a high level signal until the information processing system is started and data indicating a low level is written into the second register, and
output a low level signal, the low level signal being the same level as indicated by the data written into the second register, in response to the data being written into the second register, and
wherein the control unit is configured to
write initial setting data for initializing the peripheral device into the first register in a case where the control unit determines that an output signal from the initialization flag circuit is a high level, and
write data indicating the low level into the second register in response to completing writing of the initial setting data.

2. An information processing method executed by an information processing system including a control unit, a peripheral device including a first register, a second register, and an initialization flag circuit, the information processing method comprising the steps of:
causing the initialization flag circuit to
normally output a high level signal until the information processing system is started and data indicating a low level is written into the second register, and
output a low level signal, the low level signal being the same level as indicated by the data written into the second register, in response to the data being written into the second register, and
causing the control unit to
write initial setting data for initializing the peripheral device into the first register in a case where the control unit determines that an output signal from the initialization flag circuit is a high level, and write data indicating the low level into the second register in response to completing writing of the initial setting data.

3. A non-transitory computer-readable recording medium storing a program executable in an information processing system including a control unit, a peripheral device including a first register, a second register, and an initialization flag circuit, execution of the program causing the control unit to execute the steps of:

normally outputting a high level signal until the information processing system is started and data indicating a low level is written into the second register;

outputting a low level signal, the low level signal being the same level as indicated by the data written into the second register, in response to the data being written into the second register;

writing initial setting data for initializing the peripheral device into the first register in a case where the control unit determines that an output signal from the initialization flag circuit is a high level; and writing data indicating the low level into the second register in response to completing writing of the initial setting data.

* * * * *